United States Patent [19]

Olsen et al.

[11] Patent Number: 5,012,342
[45] Date of Patent: Apr. 30, 1991

[54] VIDEO PRIORITIZER AND MIXER

[75] Inventors: Richard Olsen, Littleton; William Gross, Northborough, both of Mass.

[73] Assignee: Prime Computer, Inc., Natick, Mass.

[21] Appl. No.: 374,650

[22] Filed: Jun. 30, 1988

Related U.S. Application Data

[63] Continuation of Ser. No. 131,927, Dec. 11, 1987, abandoned, which is a continuation of Ser. No. 835,998, Mar. 4, 1986, abandoned.

[51] Int. Cl.$^5$ .............................................. H04N 5/272
[52] U.S. Cl. ..................................... 358/181; 358/183
[58] Field of Search ............... 358/181, 183, 242, 243, 358/22, 35; 340/793

[56] References Cited

U.S. PATENT DOCUMENTS 4,420,770 12/1983 Rahman ............................... 358/183

FOREIGN PATENT DOCUMENTS 0154783 8/1985 Japan ..................................... 358/35

Primary Examiner—Howard W. Britton
Assistant Examiner—David E. Harvey
Attorney, Agent, or Firm—Wolf, Greenfield & Sacks

[57] ABSTRACT

A video mixing system that is adapted to receive respective video and graphic control signals for controlling the display content on a video monitor. A video decoder processes the video and graphic control signals, thus making it possible to mix two or more video sources, one of which is typically an in-house data terminal source and the other of which is typically connected as a graphics option. At the output of the decoder is a gate means for providing selective voltage stepped intensity control signals for controlling the video monitor.

5 Claims, 3 Drawing Sheets

VIDEO PRIORITIZER AND MIXER

This application is a continuation of application Ser. No. 131,927, filed Dec. 11, 1987, now abandoned, which is a continuation of application Ser. No. 835,998, filed Mar. 4, 1986, now abandoned.

BACKGROUND OF THE INVENTION

The present invention relates in general to video displays, and pertains, more particularly, to a video mixing system that provides the capability of processing more than one type of video signal at the same time.

For some particular display applications, it is desirable to display more than one video signal. This requires the mixing of video signals. Video mixing is usually carried out by using look-up tables employing RAM memories and with the additional use of circuitry such as resistors and transistors to control intensity levels. The basic problem with this approach is that it is relatively expensive and requires that the look-up tables be pre-programmed to accept the video signals as an address. The need for a storage RAM makes the system expensive. Also, additional space may be required for this approach which can pose a problem, particularly in applications having rigid space requirements.

Thus, it is an object of the present invention to provide an apparatus and associated method for performing video mixing while at the same time eliminating the need for expensive look-up tables and additional circuitry such as an additional RAM memory.

Another object of the present invention is to provide an improved video mixing system that is relatively simple in construction, that can be manufactured relatively inexpensively, and that provides for optimum video-graphic control.

SUMMARY OF THE INVENTION

To accomplish the foregoing and other objects, features and advantages of the invention, there is provided a control circuit for a video monitor which monitor has a plurality of pixels. The control circuit includes a means for applying digital signals from at least two different sources to the circuit, the digital signal applied to the circuit from each source at a given instant being indicative of an intensity level from such source for a given pixel of the monitor. A means is provided which is responsive to the source or sources of the digital signals, for prioritizing the intensity level indications and for decoding the digital signals to obtain an indication, based on the priority determination, of the intensity levels for the given pixel. Finally, there is a means responsive to a prioritized intensity level indication for generating an analog signal to control the intensity level of the given pixel. More specifically, a video mixing system that is adapted to receive respective video and graphic control signals for controlling the display content on a video monitor. The system comprises a decoder means for receiving the respective video and graphic control signals along with associated output gate means that is adapted to define selective voltage stepped intensity control signals. Means are provided coupling the decoder output to the gate means input. Means are also provided for coupling one of the intensity control signals to the video monitor. Now, in accordance with the invention, the decoder means preferably comprises first and second decoders with the first decoder for processing graphic control signals and the second decoder for processing video control signals. The video control signals are generated at the terminal itself while the graphic control signals are from an external graphic control source.

In accordance with the preferred embodiment of the invention, the graphic control signals include two graphic control signals coupled to first and second inputs of the first decoder. With regard to the video control signal, this includes both negation and assertion video control signals. The negation video control signal, indicative of a non-video display area, enables the first decoder and, conversely, the assertion video control signal, indicative of a video display area, inhibits the first decoder and thus inhibits the graphic control. Therefore, the decoder establishes a priority basis in which video control signals take priority over external graphic control signals.

In accordance with the preferred embodiment of the present invention, the gate means includes at least three gates connected in combination with a resistor divider having the output of each gate connected to a different location along the resistor divider to provide different respective resistance divisions corresponding to different output graphic intensity levels. There are three outputs from the first decoder that couple to the respective three gates. The outputs from the decoder are selectable only one at a time to indicate different graphic intensity levels as a function of the binary code presented on the first and second inputs to the first decoder. The second decoder is essentially continuously enabled and furthermore receives a part intensity attribute control signal coupled to one of the inputs of the second decoder. A video signal couples to a second input of the second decoder. First and second outputs from the second decoder couple to first and second respective ones of the three gates to provide either full or partial intensity video output control.

In accordance with another aspect of the present invention, there is provided a video mixing system adapted to receive respective video and graphic control signals for controlling the display content on a video monitor. The system comprises a decoder, an intensity control circuit and means coupling the decoder means to the intensity control circuit. Means are provided for coupling the graphic control signal to the decoder means. The decoder means decodes the particular graphic control signal to in turn control screen intensity level via the intensity control circuit. Means are provided for generating a video control signal that indicates one of either video or non-video control. Means are responsive to the video control for inhibiting graphic control during video control so that in essence video control takes priority over any external graphic control signals. The intensity control circuit includes a plurality of logic gates, each selectively connectable to a resistor divider network. In a preferred embodiment, three gates are employed with a decoder having three outputs coupling to the respective three gates for control thereof.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
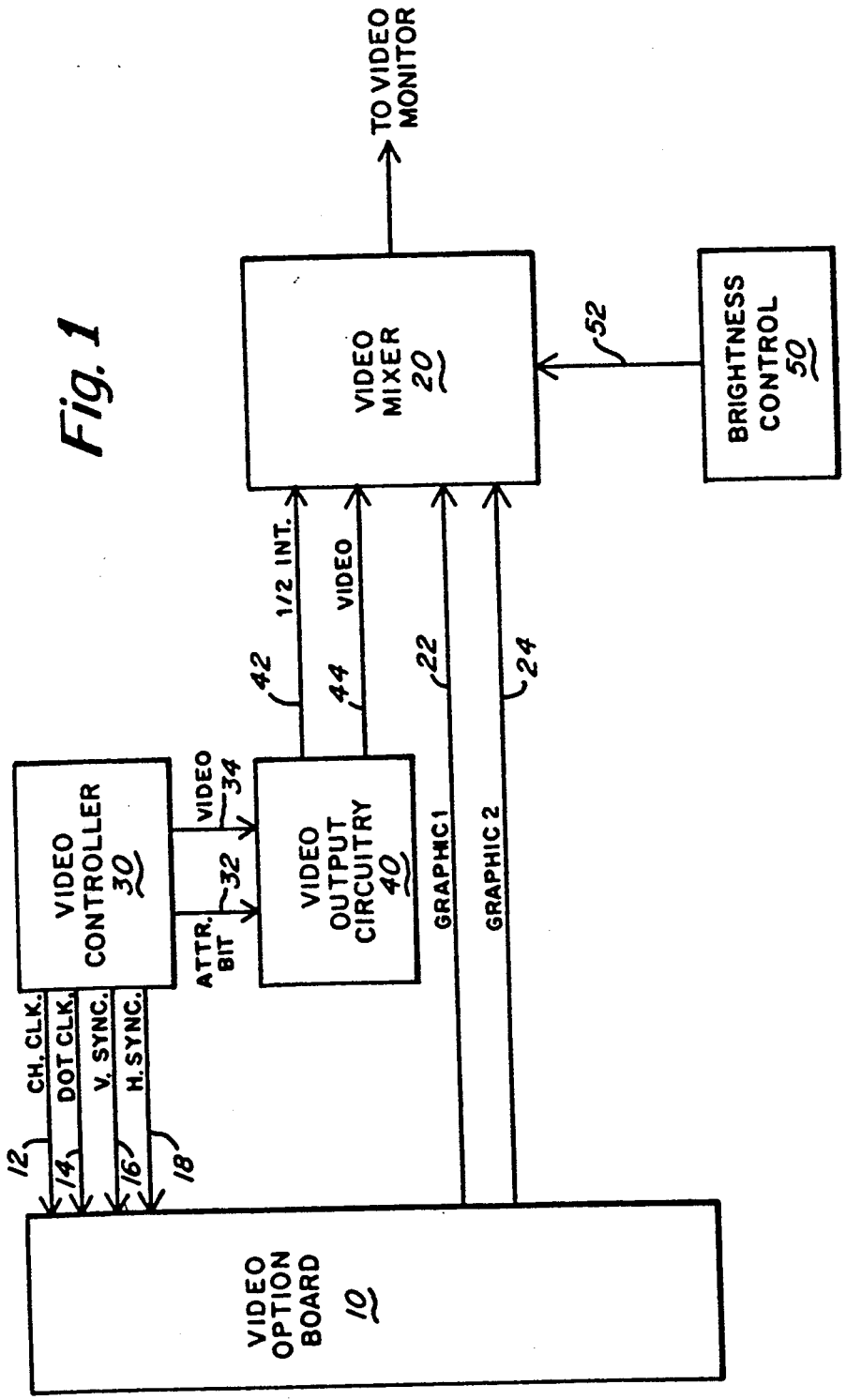
FIG. 1 is a block diagram of a video mixing system in accordance with the present invention.

Reference is now made to the drawings, and in particular to FIG. 1 which is a block diagram of a system in accordance with the present invention for providing an improved form of video mixing.

Figure 2:
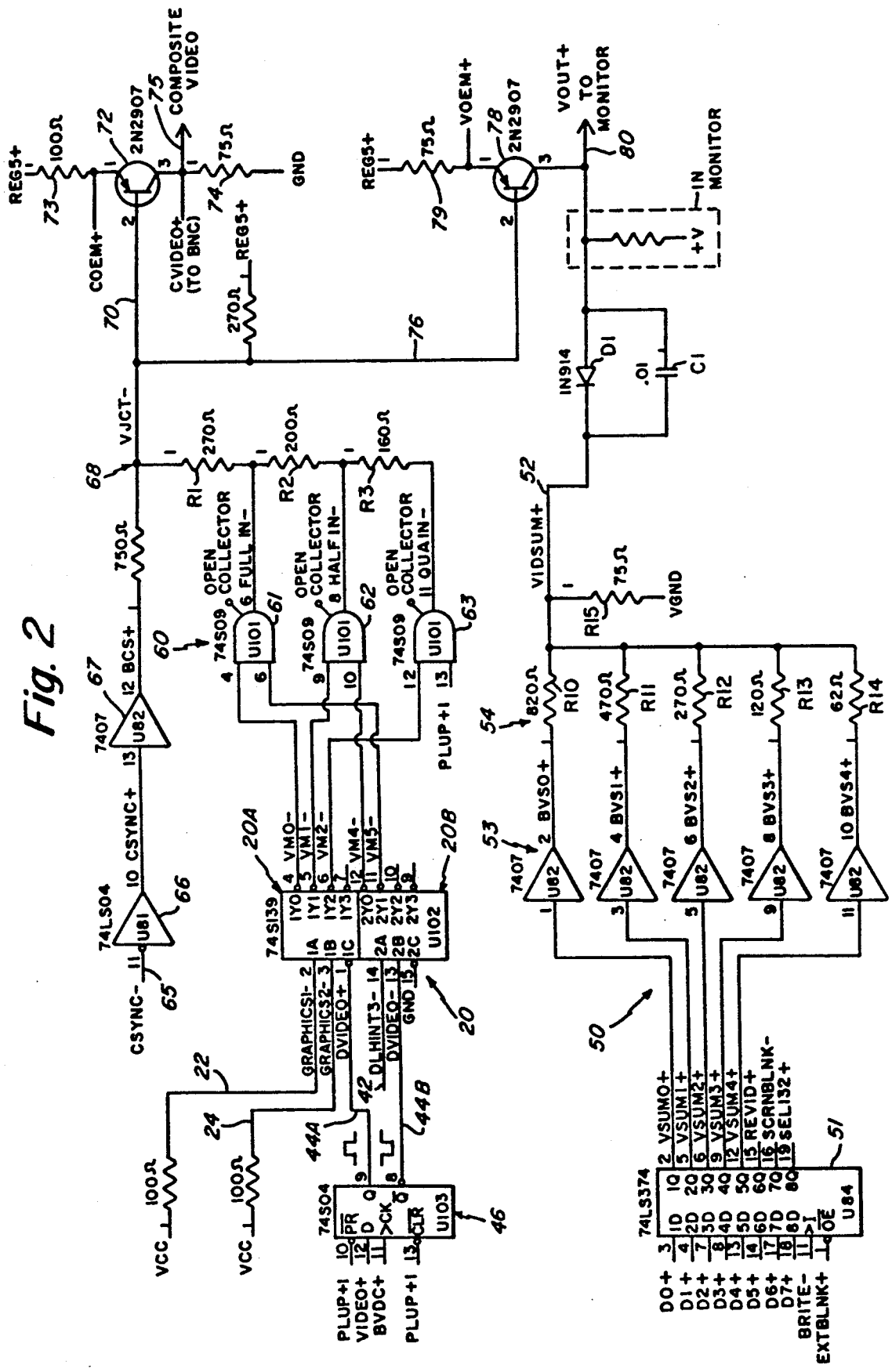
FIG. 2 is a more detailed circuit diagram of a video mixing system of the invention.
Figure 3:
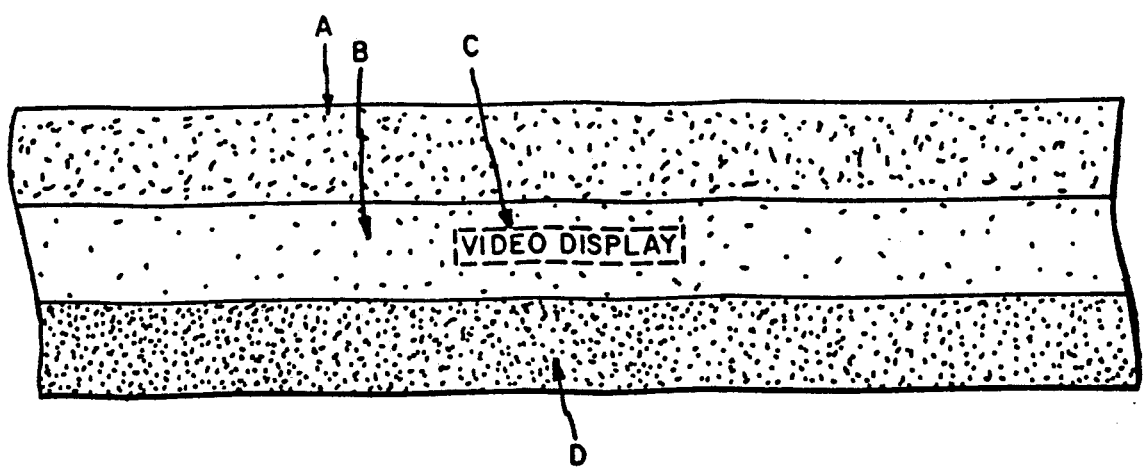
FIG. 3 is a diagram illustrating video and graphic control in accordance with the invention.

FIG. 2 shows further details of the block diagram of FIG. 1 while FIG. 3 illustrates one example showing a combination of video or alpha-numeric control along with graphic control.

FIG. 1 shows the pertinent parts of a data terminal to which there may be added a graphics option. In this regard, there is shown a video graphics option board 10 that couples with the video mixer 20 and also with the video controller 30. Control lines 12, 14, 16, and 18 couple from the video controller 30. These are typical control lines that couple to the video option board 10 for synchronizing signals between the option board 10 and the video mixer 20. FIG. 1 also shows the graphic control signals on lines 22 and 24. These signals are identified in FIG. 1 as the signals GRAPHIC 1 and GRAPHIC 2.

With regard to the output of the video controller 30, on line 12 is the character clock signal. On line 14 is the dot clock signal. Lines 16 and 18 have the respective vertical and horizontal sync signals. As indicated previously, these signals are common video control signals that are coupled to the board 10 for controlling proper coupling of the graphic control signals to the video mixer 20.

The video controller 30 is illustrated in FIG. 1 as also having two outputs coupling to the video output circuitry 40. These include signals on lines 32 and 34. The signal on line 32 is an attribute bit control signal while the signal on line 34 is the basic video content signal.

The video output circuitry 40 couples these signals on lines 32 and 34 to the video mixer 20. In this regard, there are provided coupling lines 42 and 44. The signal on line 42 is to indicate a partial or half-intensity of the video character or symbol being displayed. The signal on line 34 is the video content signal itself.

FIG. 1 also shows the brightness control register 50 that is shown interfacing with the video mixer 20 by way of the line 52. The brightness control 50 under computer control controls the brightness or contrast of the output video signal.

Reference is now made to FIG. 2 which shows further details of at least portions of block diagram of FIG. 1. In FIG. 2 like reference characters have been used to identify like parts of the system previously identified in FIG. 1. For example, the graphic control signals coupled from the video option board 10 are illustrated in FIG. 1 by the signals on lines 22 and 24. These same signals are also identified in FIG. 2 as the respective signals GRAPHICS 1 and GRAPHIC 2. These signals couple to the video mixer 20 which is specifically identified in FIG. 2 and includes the decoder 21. FIG. 2 also shows the coupling line 52 from the brightness control 50 to the video mixing circuitry.

FIG. 1 also shows two control signals coupling from the video output circuitry 40 to the video mixer 20. These are identified in FIG. 1 as the signals on lines 42 and 44. FIG. 2 also shows the signal on line 42 which is a delayed half-intensity signal identified by the signal DLHINT3− in FIG. 2. This signal couples to the input pin 14 of the decoder 21. The other signal on line 44 is separated in FIG. 2 into the assertion and negation signals identified on lines 44A and 44B. In this regard, FIG. 2 shows a D flip-flop 46 that receives the basic video input signal identified as signal VIDEO+ coupled to the D-input at pin 12 of the flip-flop 46. The clocking of the flip-flop 46 is at the clock input at pin 11 by the dot clock signal identified in FIG. 2 as a signal BVDC+.

The output from the flip-flop 46 includes an assertion output at pin 9 and a negation output at pin 8. The output at pin 9 is the single DVIDEO+ while the signal at pin 8 is the signal DVIDEO−. These are the signals on the respective lines 44A and 44B. These signal represent the video content relating to a particular pixel area on the display. Reference will be made hereinafter to these two particular signals as they control the decoder 21.

The decoder 21 as indicated in FIG. 2 is of type 74S139 and is actually comprised of two decoder sections identified in FIG. 2 as a first decoder 21A and a second decoder 21B. Each of the decoder sections has three inputs. With regard to decoder 21A, these are identified as inputs 1A, 1B, and 1C. With regard to decoder 21B, the inputs are at terminal 2A, 2B, and 2C. The terminals 1G and 2G of the respective decoders are enabling terminals. With regard to the first decoder 21A, this is the signal DVIDEO+ and thus the first decoder is enabled only when this signal is low or in other words when the video signal is not present. Thus it is only during display intervals in which there is no video being displayed that the graphics can control.

With regard to the input 2C of the decoder 21B, it is noted that this is permanently grounded, thus essentially permanently enabling the decoder 21B.

The decoder 21A is illustrated as having three separate outputs identified as output signals VM0−, VM1−, and VM2−. These outputs are taken at the respective pins 4, 5, and 6. These are also identified as the outputs 1Y0, 1Y1, and 1Y2. These three outputs as illustrated in FIG. 2 couple to the gate means 60 which comprise three AND gates 61, 62, and 63. Each of these AND gates are operative from low going outputs from the decoder and thus function essentially on an "OR" basis.

Thus, for example, with regard to the AND gate 61, either a low input on pin 4 or a low input on pin 5 provides a low output. This low output essentially selects one of the positions of the resistor divider that is comprised of resistors R1, R2, and R3. If gate 61 is selected with a low output therefrom, with gates 62 and 63 non-selected, then the resistor network comprising resistors R1, R2, and R3 is essentially grounded at the junction between resistors R1, and R2 providing a total resistance of the network of resistor R1 alone or namely the 270 ohms as illustrated for the resistor R1 in FIG. 2. This shunt resistance effects the output intensity of the graphics signal.

Now, with regard to the graphics control, as indicated previously, the graphics control can only take place in the non-video mode of o or in other words, when the input to pin 1 of decoder 21A at its low logic level. This essentially means that the internal video of the data terminal is not outputting any video signals and under those circumstances, then the graphics control can come into play. This is illustrated in a very simplified manner in FIG. 3 in which a relatively small segment of the display monitor is illustrated. This may be illustrating a bar chart in which the graphics in area A is illustrating a particular bar chart intensity. This is controlled externally through the video option slot associated with the data terminal. Also note in FIG. 3 the display area B which is also under graphics control except for the segment C in which there is some video that is to be displayed as indicated by the term "video display" in FIG. 3. However, for the majority of the segment B of the bar chart, the signal at pin 1 to the decoder is low essentially enabling decoder 21A.

With the decoder 21A enabled by the signal from the flip-flop 46, then depending upon the relative binary states of the signals on lines 22 and 24, there will be different outputs from the decoder. Because there are two binary signals, there are thus, essentially four different conditions that can be represented. If both of the signals on lines 22 and 24 are high, then all of the outputs from decoder 21A are also high. This is simply an indication that there is neither video nor graphics control. Essentially, none of the gates 61–63 are activated and the resistor network comprised of resistors R1–R3 is essentially open.

If both of the signals on lines 22 and 24 are low, then there is a low output only at pin 4 which is the signal VM0—. This provides a low input to gate 61 providing a low or ground output therefrom for providing full intensity of the graphics. It is noted that when there is an output signal VM0—, then the other outputs of VM1— and VM2— are both at a high logic level and thus it is only gate 61 that is active and thus only resistor R1 is controlling in the control of intensity under graphics operation.

Half-intensity of the graphics is indicated when only gate 62 is enabled. This occurs when the signal on line 22 is high while the signal on line 24 is low, thus generating a low output at pin 5 which is the signal VM1—.

Thus, when the signal VM1— is low, this means that the output of gate 62 is low. The outputs of gates 61 and 63 are both still at their high logic level and thus only resistors R1 and R2 are in the resistor network. The circuit proceeds from resistor R1 through resistor R2 to the output of gate 62 where the resistor string is essentially grounded. This thus couples resistors R1 and R2 in series providing a larger resistance and thus a decrease in intensity to what is considered as half graphics intensity.

When the signal on line 22 is at a low logic level, and the signal on line 24 is at a high logic level, then there is a low outputted on pin 6 of decoder 21A. The signal VM2— goes to its low logic level state while the signals VM0— and VM1— are both at their high logic level state. This means that only gate 63 is activated and only gate 63 has a low or ground output. This means that all resistors R1–R3 are included in the resistor string, and thus there is a total resistance of all three resistors included in the resistor network. This provides for a one-fourth graphics intensity.

Now, if the internal video control is again to take over, then the signal on line 44A goes to its high state essentially disabling the decoder 21A so that internal video control takes priority over external graphics control. The video output signal from the flip-flop 46 at line 44B couples to input pin 13 of decoder 21B. As indicated previously, the enable input at pin 15 to decoder 21B is always grounded. The other input at line 42 to decoder 21B is the half-intensity video signal. If the logic level signal on lines 13 and 14 are both low, then there is a low output only at pin 12. Thus, the signal VM4— is at a low logic level. This signal couples to gate 62 only and thus for the condition in which the half-intensity signal is present. There is a corresponding half-intensity video output generated which will correspond to control of a particular pixel area on the screen which in the example of FIG. 3, is the area C in which internal video control is used to provide alpha-numeric display.

If the signal at pin 13 is low, but the signal at pin 14 is high because the video is not to be at half-intensity, then only the output at pin 11 is activated. This is the signal VM5— which goes to its logic low level state enabling only the gate 61. This provides for a full intensity of the video signal.

Thus, by the use of the decoder 21, both graphic control and video control signals may be coupled thereto and may be used on a priority basis for controlling display areas on the screen. As indicated by the illustration of FIG. 3, the graphic signals may be used to provide the three different levels of graphic intensity as illustrated in the graphic bar code areas A, B, and D. The video signal such as coupled to pins 1 and 13 of the decoder, is then used to control whether a video signal is to dominate over the external graphics. This would occur in segment B at the area C wherein the graphics is essentially overridden to provide for direct video control which is usually for the generation of alpha-numeric characters such as illustrated in FIG. 3.

FIG. 2 also shows the output circuitry that intercouples the decoder and gates to the video monitor. There is a synchronization signal coupled at line 65 and furthermore coupled by way of amplifiers 66 and 67 to junction node 68. The resistor string comprised of resistors R1, R2, and R3 is connected at node 68. One path from the node 68 includes a connection by way of line 70 to the transistor 72. The emitter of transistor 72 has disposed in its path a resistor 73. The collector of transistor 72 couples by way of a resistor 74 to ground. A composite video signal is taken at the output 75.

The second path from the node 68 is by way of conductor 76 to transistor 78. Transistor 78 has, associated with its emitter, a resistor 79 and has its collector coupled to the output line 80 which couples to the monitor.

The conduction of transistor 78 is controlled to determine intensity level of the output signal coupled to the monitor. Thus, it is noted that the resistor string of resistors R1–R3 essentially couple in series with the base of transistor 78 and thus depending upon the value of the selected resistance of the resistor string, the transistor 78 is controlled to different levels of conduction for controlling the intensity of the output signal that controls the video monitor.

A further form of brightness or contrast control has been referred to previously in FIG. 1 by the brightness control 50. This is also illustrated in somewhat further detail in FIG. 2 including the brightness register 51 along with amplifiers 53 and resistor string 54. The resistor string 54 is comprised of resistors R10–R14. FIG. 2 also shows the terminating resistor R15 along with diode D1 and capacitor C1 forming a parallel circuit that couples to the output line 80.

The brightness register 51 may be of type 74LS374 having controlled inputs and a number of data inputs identified in FIG. 2 as data signals D0–D7. Under compute control, these provide a series of output signals from the register identified as signals VSUM0+ through VSUM4+. These five signals couple by way of five separate paths, each including one of the amplifiers 53 and one of the five resistors R10-R14. The five outputs from the brightness register will provide 32 combinations of brightness to the monitor. With all outputs low, the brightness is minimum and with all outputs high, the brightness is maximum. When this signal is at a high logic level, there is provided a circuit path via the selected resistor that forms a type of brightness control. In this regard, it is noted that the diode D1 couples to ground through the resistor R15 which is a 75 ohm resistor. The other resistors R10-R14 are adapted to be selected on an combinational basis depending upon the desired brightness or contrast. In essence, there is formed a voltage divider between the combination of resistors R10-R14 and the resistor R15 and the input impedance of the monitor for essentially providing a reference at the cathode or diode D1. This provides for a series of voltage values that are used to control the output voltage intensity level coupled to the video monitor. The higher the resistor selected, such as the high ohmage resistor R10, which is a 820 ohm resistor, then the higher the voltage at the cathode of the diode D1.

Thus, in accordance with the invention, there is provided a quite simplified arrangement for providing both alpha-numeric or other form of video control in association with external graphic control, and in which the video control has priority control over the graphics display. In accordance with the invention, there is also provision for separate brightness or contrast control under computer data terminal control. As indicated, this control is carried out in a simplified manner by the use of a decoder rather than the requirement for separate memory storage.

Having now described a limited number of embodiments of the present invention, it should now be apparent to those skilled in the art that numerous other embodiments and modifications thereof are contemplated as falling within the scope of the present invention as defined by the appended claims.

What is claimed is:

1. A control circuit for a video monitor having a plurality of pixels comprising:

means for applying digital signals from a video source and a graphic source to said circuit, the digital signals being applied to the circuit from the graphic source at a given instant being a coded graphic intensity level indication for a given pixel of the monitor and the digital signals from the video source being at least indicative of the presence of a video signal for such pixel;

decoder means responsive to a signal from said video source being present for inhibiting the display of graphics at said pixel, permitting video to be displayed, and to a signal from the video source not being present for providing a decoded intensity indication for a graphics display, said decoder means having first and second decoders, said first decoder processing digital signals from the video source and said second decoder processing digital signals from the graphics source; and means responsive to a decoded intensity level indication for generating an analog signal to control the intensity level of the given pixel.

2. A control circuit as claimed in claim 1 wherein said first decoder is normally enabled; and including means for enabling the second decoder when a signal from the video source is not present.

3. A control circuit as claimed in claim 1 wherein said means for generating includes a plurality of gating means, the number of gating means being at least equal to the number of intensity levels, voltage divider means, the output of each gating means being connected to a different point on the voltage divider means, and means for connecting the output of the voltage divider means as the intensity control input to the video monitor.

4. A control circuit as claimed in claim 3 wherein said voltage divider is a resistance divider.

5. A control circuit as claimed in claim 3 wherein the highest intensity output from said decoders is applied to the gating means connected to the point of the voltage divider means producing the highest voltage output, lower intensity outputs from the decoders being applied to gating means connected to points of the voltage divider means producing successively lower voltage outputs.

* * * * *